United States Patent [19]

Kiritani et al.

[11] 3,963,553

[45] June 15, 1976

[54] PROCESS FOR SEPARATING A NUMBER OF SHEETS INTO GROUPS

[75] Inventors: Masataka Kiritani; Hajime Kato, both of Fujimiya, Japan

[73] Assignee: Fuji Photo Film Co., Ltd., Minami-ashigara, Japan

[22] Filed: Dec. 11, 1974

[21] Appl. No.: 531,500

[30] Foreign Application Priority Data

Dec. 11, 1973 Japan............................. 48-139417

[52] U.S. Cl................................ 156/305; 156/328; 282/DIG. 2; 282/22 R; 282/24 R; 428/194; 260/67 A
[51] Int. Cl.².......................................... B41L 1/24
[58] Field of Search..................... 260/67 A, 505 C; 282/DIG. 2, 24, 22, 26; 156/305, 290, 291, 297; 428/194; 427/285

[56] References Cited

UNITED STATES PATENTS

| | | | |
|---|---|---|---|
| 3,216,926 | 11/1965 | Kurtz et al. | 260/67 A |
| 3,393,925 | 7/1968 | Calvert | 428/194 X |

FOREIGN PATENTS OR APPLICATIONS

| | | |
|---|---|---|
| 2,254,483 | 6/1973 | Germany |

Primary Examiner—Ralph S. Kendall
Attorney, Agent, or Firm—Sughrue, Rothwell, Mion, Zinn & Macpeak

[57] ABSTRACT

A process for separating a number of sheets into groups of sheets comprising coating an adhesive composition on an edge of a stack of the sheets and fanning the sheets. The adhesive composition contains a naphthalene sulfonic acid-formaldehyde condensation product and a water-soluble metal salt.

9 Claims, No Drawings

PROCESS FOR SEPARATING A NUMBER OF SHEETS INTO GROUPS

BACKGROUND OF THE INVENTION

1. Field of the Invention

The present invention relates to a process for separating a number of sheets into groups, and an adhesive composition for use therein.

2. Description of the Prior Art

Processes for separating a number of sheets such as a pressure sensitive copying paper into groups are described in U.S. Pat. Nos. 2,711,375; 2,712,507; 3,730,456; 2,730,457; 3,418,250; 3,432,327; etc., for example, and adhesive compositions for use therein are described in detail in Japanese Patent Application No. 35696/1971, Japanese Pat. Application Nos. 40464/1973 and 7634/1975, etc.

In the prior art methods, gelatin, gelatin derivatives, gelatin decomposition products, or mixtures thereof with aqueous emulsions of a resin, i.e., a polymer latex, are used as an adhesive component.

However, since gelatins tend to degrade, and the viscosity thereof varies greatly depending upon the temperature, adhesives containing gelatins are not satisfactory in storage stability, adhesiveness, and separability. In the present specification, the term "separability" designates that the sheets are separated into groups. Thus, when the separability is good, the sheets are easily separated into groups, and when the separability is poor, the sheets are difficult to separate into groups. The latexes which are added for the purpose of improving the adhesiveness decrease the separability, and thus it is desired that the adhesives containing the latexes are further improved.

SUMMARY OF THE INVENTION

An object of the present invention is to provide a process for separating simply and correctly a number of sheets into groups.

Another object of the present invention is to provide an adhesive composition which has excellent storage stability, adhesiveness, separability, and drying rate, and which is used in separating a number of sheets into groups.

These and other objects and advantages of the present invention will be apparent from the following description.

The objects of the invention are attained by using an adhesive containing a naphthalene sulfonic acid-formaldehyde condensation product and a water-soluble metal salt.

DETAILED DESCRIPTION OF THE INVENTION

By the process for separating sheets into groups of the present invention is meant that when the cut edge of a stack of a number of sheets, i.e., an edge of a stack of sheets, is coated with an adhesive and fanned or stroked, the sheets of each group are selectively adhered. The process will be explained by reference to the case where the sheets are pressure sensitive copying papers. In this case, the pressure sensitive copying papers are the combination of a sheet produced by coating a microcapsule layer containing a color former on a support (hereinafter referred to as an "A Sheet"), a sheet produced by coating a developing agent layer and the foregoing microcapsule layer on the surface and the back of a support, respectively (hereinafter referred to as a "B Sheet"), and a sheet produced by coating a developing agent layer on a support (hereinafter referred to as a "C Sheet"), or the combination of an A Sheet and a C Sheet.

These pressure sensitive copying papers are assembled in the sequence of, for example, A—C, A—C, A—C, . . . , or A—B—B . . . —B—C, A—B—B . . . —B—C, A—B—B . . . —B—C, . . . , and they are cut to thereby produce, for example, a sheaf of slips. When an adhesive composition is coated on the cutting plane, or the edge of the stack, and dried, each A—C or A—B—B . . . —B—C set is selectively adhered and no adhesion occurs between C and A. The adhesion strength of A—C or A—B—B . . . —B—C must be at least sufficient such that these sheets are not peeled apart with simple handling. It is most preferred that no adhesion between C and A occurs at all, i.e., a good separability. Thus, by applying an adhesive composition to pressure sensitive copying papers, the pressure sensitive copying papers are easily separated into groups comprising a certain number of papers which are required for copying.

The naphthalene sulfonic acid-formaldehyde condensation products of the present invention are preferably represented by the following general formula:

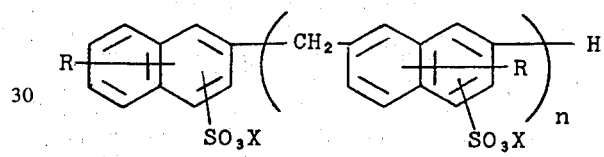

wherein R, which may be the same or different, (a plurality of R groups can be contained in the naphthalene nuclei), is a hydrogen atom or an alkyl group; X is a hydrogen atom, an alkali metal atom, or an ammonium group, and n is an integer.

Those condensation products in which the alkyl group contains 1 to 18 carbon atoms, X is a sodium or potassium atom, or an ammonia group, and $n$ is 1 to 13, are conveniently used and are thus preferred in the present invention. Particularly, those condensation products in which R is a hydrogen atom or an alkyl group containing 1 to 4, particularly 1 to 3 carbon atoms, X is a sodium or potassium atom, and $n$ is 1 to 5, particularly 2 to 5, are preferred. Suitable examples of alkyl groups having 1 to 18 carbon atoms are methyl, ethyl, propyl, isopropyl, n-butyl, hexyl, octyl, undecyl, hexadecyl, etc. Preferable examples of these alkyl groups are methyl, ethyl, propyl, isopropyl and n-butyl and hydrogen is particularly preferred as R. Various compounds represented by the above general formula are known as anionic surface active agents and are readily available.

The degree of polymerization and the substituents of the naphthalene sulfonic acid-formaldehyde condensation product of the present invention sometimes influence the effect of the present invention. Hence, mixtures of condensation products having different degrees of polymerization and/or different substituents are sometimes useful.

The water-soluble metal salts as used in the present invention include those salts having a solubility in water at 25°C of at least 0.1% by weight, preferably 0.2% by weight or more, e.g., ammonium salts and salts of univalent metal ions such as $K^+$, and $Na^+$; salts of divalent metal ions such as $Mg^{2+}$, $Ca^{2+}$, $Zn^{2+}$, and $Sn^{2+}$; and salts of trivalent metal ions such as $Al^{3+}$ and $Fe^{3+}$. Anions forming water soluble salts together with the above-described metal ions are $Cl^-$, $Br^-$, $NO_2^-$, $NO_3^-$, $SO_4^{2-}$, $S_2O_3^{2-}$, $HSO_4^-$, $SO_3^{2-}$, $B_{10}O_{16}^{2-}$, $HCO_3^-$, $CO_3^{2-}$, $PO_4^{3-}$, $H_5(PO_4)_2^-$, $H_2PO_3^-$, $H_2PO_4^-$, $HPO_3^{2-}$, $HPO_4^{2-}$, $PO_3^{3-}$, and the like. Specific examples of suitable water soluble salts of these metal ions and anions are, for example, $K_2B_{10}O_{16}$, $KBr$, $K_2CO_3$, $KCl$, $KHCO_3$, $KH_5(PO_4)_2$, $KHSO_4$, $KI$, $KNO_2$, $KNO_3$, $K_3PO_4$, $K_2SO_4$, $K_2S_2O_3$, $NaAl(SO_4)_2$, $NaBr$, $Na_2CO_3$, $NaCl$, $NaHCO_3$, $NaH_2PO_3$, $Na_2HPO_3$, $Na_2HPO_4$, $NaH_2PO_4$, $NaNO_3$, $NaNO_2$, $Na_3PO_4$, $Na_2SO_4$, $Na_2SO_3$, $Na_2B_{10}O_{16}$, $NaHSO_4$, $NH_4Cl$, $NH_4HCO_3$, $NH_4H_2PO_3$, $NH_4H_2PO_4$, $NH_4NO_3$, $(NH_4)_2SO_4$, $MgBr_2$, $MgCO_3$, $MgCl_2$, $MgI_2$, $Mg(NO_2)_2$, $Mg(NO_3)_2$, $MgSO_3$, $MgSO_4$, $CaCl_2$, $CaBr_2$, $Ca(NO_2)_2$, $CaSO_4$, $CaS_2O_3$, $SnCl_2$, $SnSO_4$, $ZnBr_2$, $ZnCl_2$, $Zn(NO_3)_2$, $Zn_3(PO_4)_2$, $ZnSO_4$, $AlCl_3$, $Al(NO_3)_3$, $Al_2(SO_4)_3$, $FeCl_3$, $Fe(NO_3)_3$, $Fe_2(SO_4)_3$, and the like. Of these salts, salts of $K^+$, $Na^+$ or $Zn^{2+}$, i.e., $K_2SO_4$, $Na_2SO_4$, $ZnCl_2$, $ZnSO_4$, and the like are preferred, and $Na_2SO_4$ and $ZnCl_2$ are particularly preferred in the present invention.

The addition of a polymer emulsion to the adhesive composition of the present invention brings about even more effective results.

Preferably the adhesive composition of the present invention contains about 5 to 40% by weight, particularly 7 to 30% by weight, of the naphthalene sulfonic acid-formaldehyde condensation product, and about 0.1 to 6% by weight, particularly 0.2 to 4% by weight, of the water-soluble metal salt. The solvent used in the adhesive composition of this invention preferably is water. However, an organic solvent can be used together with water to increase the permeability of the adhesive composition into the sheets, e.g., pressure-sensitive copying papers, to which the adhesive composition is to be applied. Since an organic solvent has such a property, all types of organic solvents can be used in the invention. Suitable examples of organic solvents are alcohols (e.g., methanol, ethanol, etc.), ketones (e.g., acetone, methyl ethyl ketone, etc.), esters (e.g., ethyl acetate, butyl acetate, etc.), ethers (e.g., ethyl ether, etc.), and the like. The amount of organic solvent which can be used is about 0.01 to 100% by weight, preferably 0.1 to 50% by weight, based on the weight of the water present.

The adhesive composition can contain, if desired, a water-soluble or water-dispersible binder. In general, the use of a binder in an adhesive composition for separation of sheets into groups has been disadvantageous in that separability is lost and a long period of time is required in the adhesion although the adhesion strength is increased. To the contrary, in the present invention, the use of a binder enables a composition which has excellent separability and adhesiveness to be obtained, and thus the composition can be extended to a wider variety of applications.

Suitable water-soluble binders include natural polymeric compounds such as proteins, e.g., gelatin, gum arabic, albumin, casein, and the like, celluloses, e.g., carboxymethyl cellulose, hydroxyethyl cellulose, and the like, saccharides, e.g., agar, sodium alginate, starch, carboxymethyl starch, and the like; synthetic polymeric compounds such as polyvinyl alcohol, polyvinyl pyrrolidone, maleic acid polymers, e.g., a styrene-maleic acid copolymer, a methyl vinyl ether-maleic acid copolymer, a rosin modified maleic acid polymer, and the like, acrylic acid polymers, e.g., polyacrylic acid, an acrylic acid-acrylamide copolymer, and the like; etc. Suitable water-dispersible binders include generally latexes and emulsions with water as a dispersion medium, such as styrene-butadiene based latex, a butadieneacrylonitrile based latex, a chloroprene based latex, a vinyl acetate based latex, an acryl based latex, a vinyl chloride based latex, or a like based latex as obtained by emulsion polymerization, and a polybutadiene emulsion, a polyisoprene emulsion, a butyl rubber emulsion, and the like which are produced by dispersing polymers produced by ion polymerization in water using a solvent and an emulsifier.

The polymer material latexes will be described in detail. The styrene-butadiene rubber latex comprises 25 to 75 parts by weight of styrene and 75 to 25 parts by weight of butadiene, preferably 40 to 65 parts by weight of styrene and 60 to 35 parts by weight of butadiene, and the latex can more preferably be carboxymodified. The butadiene-acrylonitrile rubber latex comprises 75 to 60 parts by weight of butadiene and 25 to 40 parts by weight of acrylonitrile. For the vinyl acetate based latex, polyvinyl acetate, and copolymers of vinyl acetate and acrylic acid esters or methacrylic acid esters, e.g., methyl acrylate, ethyl acrylate, and methyl methacrylate, can be used, and particularly, a vinyl acetate-acrylic acid ester copolymer and a vinyl acetate-methacrylic acid ester copolymer are preferred. For the acryl based latex, a methacrylic acid ethyl esteracrylic acid ethyl ester copolymer, a styrene-acrylic acid ester copolymer, a butadiene-acrylic acid ester copolymer, and the like can be used. Furthermore, a vinyl chloride based latex and a vinylidene chloride based latex, etc., can be used. Particularly useful polymer meterial latexes are a styrene-butadiene based latex and an acryl based latex, and carboxy modified latexes are particularly preferred. The polymer material emulsion which can be used in the present invention generally has a solid content of 10 to 70% by weight, a particle diameter of 0.1 to 5.0 $\mu$, and a viscosity of 0.5 to 1000 poises.

The water-soluble or water-dispersible binders are used for forming a film, and it is further preferred that they have adhesiveness as an adhesive and the ability to selectively permeate an adhesive between sheets. Such binders include carboxymethyl cellulose, polyvinyl alcohol, and the like.

Where the adhesive composition contains a water-soluble or water-dispersible binder, the adhesive composition can contain about 0.5 to 100% by weight, particularly 0.5 to 10% by weight, of the water-soluble binder based upon the weight of the abovedescribed condensation product and about 10 to 300% by weight, preferably 50 to 200% by weight, of the water-dispersible binder based upon the weight of the above-described condensation product.

The adhesive composition of the present invention can contain, if desired, cationic, anionic, non-ionic or amphoteric surface active agents such as sodium dodecylbenzene sulfonate, trimethyloctadecyl ammonium chloride, sodium oleate, a polyoxyethylene alkylaryl ether, polyethylene glycol dodecylphenyl ether, sodium lignin sulfonate, sorbitan monooleate, an alkyl betaine, an alkyl imidazole, and the like. The surface active agent can be present in a proportion of 0.1 to 5% by weight based upon the weight of the above-described condensation product.

The microcapsules for use in pressure sensitive copying papers can be easily produced using well known methods. Since the concentration of the color former can be easily determined on dissolving the color former in the solvent employed in the production of the microcapsules, the present invention is not restricted in terms of microcapsule production methods at all. Microcapsules can be produced according to, for example, the coacervation method as described in U.S. Pat. Nos. 2,800,457; 2,800,458; 3,041,289; 3,687,865; etc., the interfacial polymerization method as described in U.S. Pat. Nos. 3,492,380; 3,577,515, British Pat. Nos. 950,443; 1,046,409; 1,091,141; etc., internal polymerization method as described in British Pat. No. 1,237,498, French Pat. Nos. 2,060,818; 2,090,862; etc., external polymerization method as described in British Patent No. 989,264, Japanese Pat. Publication Nos. 12380/1962, 14327/1962, 29483/1970, 7313/1971, 30282/1971, etc., and the like.

Solvents for use in dissolving the color former in the present invention are not limited and thus any hitherto used solvent can be employed. Typical examples of suitable solvents are aromatic synthetic oils such as alkylated naphthalene, alkylated biphenyl, hydrogenated terphenyl, alkylated diphenyl methane, and the like (wherein the number of carbon atoms in the alkyl group is about 1 to 5, and the number of alkyl groups is 1 to 4), petroleum fractions such as kerosene, naphtha, paraffin, and the like, aliphatic synthetic oils such as chlorinated paraffin, and the like, vegetable oils such as cotton seed oil, soy bean oil, linseed oil, and the like, and mixtures thereof. The concentration of the color former solution is not particularly restricted, and thus microcapsules can be easily produced by one skilled in the art using a concentration of the color former solution (about 1 to 10%) as used in conventional pressure sensitive copying papers.

The color former of the present invention is a substantially colorless compound which forms a color when brought in contact with a solid acid and the color former can be defined as an electron donating and substantially colorless organic compound. The type and characteristics of the color former do not materially influence the present invention because the composition of the adhesive is important in the present invention. Thus, any kind of color former can be used. For example, triarylmethane compounds, diarylmethane compounds, xanthene compounds, thiazine compounds, spiropyran compounds and the like can be used.

Representative examples of color formers are listed below.

Examples of triphenylmethane compounds are 3,3-bis(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)-5-dimethlaminophthalide, 3-p-dimethylaminophenyl-3-(1-methylpyrrol-2-yl)-6-dimethylaminophthalide, and the like.

Examples of diphenylmethane compounds are 4,4'-bisdimethylaminobenzhydrine benzyl ether, N-halophenyl leuco Auramine, N-2,4,5-trichlorophenyl leuco Auramine, and the like.

Examples of xanthene compounds are Rhosdamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, and the like.

Examples of thiazine compounds are benzoyl leuco Methylene Blue, p-nitrobenzyl leuco Methylene Blue, and the like.

Examples of spiro compounds are 3-methyl-spirodinaphthopyran, 3-ethyl-spiro-dinaphthopyran, 3,3-dichloro-spiro-dinaphthopyran, 3-benzyl-spiro-dinaphthopyran, 3-methyl-naphtho(3-methoxybenzo)-spiropyran, 3-propyl-spiro-dibenzodipyran, and the like.

These color formers can be used alone or as mixtures comprising two or more thereof.

Thus, a microcapsule coating liquid can be obtained. Preferably, the microcapsule is mono-nuclear, but the objects of the present invention can be attained with multi-nuclear capsules. The size of the microcapsules is generally about 1 to 500 $\mu$, and preferably about 2 to 50 $\mu$. In the present invention, capsules having about the same size can be used.

The microcapsule coating liquid can be coated on a support as it is since it is generally a capsule dispersion liquid. A binder such as a latex, e.g., a styrene-butadiene rubber latex, and the like or a water-soluble polymeric compound, e.g., starch, carboxymethyl cellulose, polyvinyl alcohol, gum arabic, casein, gelatin, and the like can be added and coated, with or without a separation of the microcapsules from the capsule dispersion. Furthermore, a capsule reinforcing agent such as a fine powder of cellulose as described in U.S. Pat. No. 2,711,375, a fine powder of a polymer as described in U.S. Pat. No. 3,625,736, a fine powder of starch as described in British Pat. No. 1,232,347, and microcapsules containing no color former as described in British Pat. No. 1,235,991 can be added to the capsule coating liquid or a capsule layer. It is desirable that the capsule reinforcing agent is present scattered in the capsule layer or on the surface thereof rather than in a layer form.

A paper, a plastic film, a resin coated paper, a synthetic paper, and the like can be used as the support. The microcapsule layer is coated on at least one side of the support or on or under the developer layer as described hereinafter, or on the side of the support opposite the developer layer.

In the present specification, the developer designates a solid acid, and more specifically an electron accepting solid acid. Examples of developers are described in the abovedescribed patents, and include, for example, clays, e.g., acid clay, activated clay, attapulgite, and the like, organic acids, e.g., aromatic carboxy compounds such as salicylic acid, aromatic hydroxy compounds such as p-t-butylphenol, p-t-amylphenol, o-chlorophenol, m-chlorophenol, p-chlorophenol, and the like, or metal salts thereof such as the zinc salt and the like, mixtures of an organic acid and a metal compound, e.g., zinc oxide, acid polymers, e.g., a phenol-formaldehyde resin, and a phenolacetylene resin, and the like. Suitable developers are described in U.S. Pat. Nos. 3,501,331; 3,669,711; 3,427,180; 3,455,721; 3,516,845; 3,634,121; 3,672,935; 3,722,120;

3,772,052; 3,834,929; 3,874,895; Japanese Pat. Publication Nos. 33209/73, 33210/73, 13451/74, 13454/74 etc.

The developer can be coated on the support together with a binder. Suitable supports are described above. Latexes such as a styrene-butadiene rubber latex, a styrene-butadiene-acrylonitrile latex, a styrene-maleic acid copolymer latex, and the like; water-soluble natural polymeric compounds such as proteins, e.g., gelatin, gum arabic, albumin, casein, etc., celluloses, e.g., carboxymethyl cellulose, hydroxyethyl cellulose, etc., saccharides, e.g., agar, sodium alginate, starch, carboxymethyl starch, etc., and the like; water-soluble synthetic polymeric compounds such as polyvinyl alcohol, polyvinyl pyrrolidone, polyacrylic acid, polyacrylamide, and the like; organic solvent-soluble polymeric compounds such as nitrocellulose, ethylcellulose, a polyester resin, polyvinyl acetate, polyvinylidene chloride, a vinyl chloride-vinylidene chloride copolymer, and the like; etc., can be used as the binder. These binders can also be used as a binder for the capsule dispersion liquid. In addition, hitherto known additives can be added to the developer layer.

The naphthalene sulfonic acid-formaldehyde condensation product can be considered to be a quite excellent component in that it is not only free from the disadvantages of the gelatins, but it provides an adhesive with separability. The naphthalene sulfonic acid-formaldehyde condensation product alone has insufficient adhesiveness, but the adhesiveness is considerably improved by using the condensation product in combination with the water-soluble metal salt.

The present invention will be explained in greater detail by reference to the following examples. A, B, and C Sheets as used in the examples were prepared as follows. Unless otherwise stated, all parts, percentages, ratios and the like are by weight.

Preparation Of A Sheet

In 40 parts of water at 40°C, 6 parts of an acid treated gelatin having an isoelectric point of 8.2 and 4 parts of gum arabic were dissolved. To the resulting solution, 0.2 parts of Turkey red oil was added to prepare a colloidal solution. To the colloidal solution was added with vigorous stirring 45 parts of diisopropyl naphthalene oil (a color former oil) in which 30% by weight of Crystal Violet lactone and 2.5% by weight of benzoyl leuco Methylene Blue were dissolved, to prepare an O/W emulsion. When the size of the oil droplets became 8 to 12 $\mu$, the stirring was stopped. To the emulsion was added 185 parts of hot water at 40°C. With stirring, a 20% hydrochloric acid aqueous solution was added dropwise to adjust the pH to 4.4. The emulsion was cooled externally with stirring to thereby gel the colloidal wall accumulated on the oil droplet. When the liquid temperature reached 10°C, 1.5 parts of a 37% formaldehyde aqueous solution was added while continuing the stirring. Then, 20 parts of a 7% by weight solution of carboxymethyl cellulose sodium salt having a degree of etherification of 0.75 was added. A 10% by weight sodium hydroxide solution was added dropwise to adjust the pH of the system to 10, and the system was heated externally and kept at 40°C for 1 hour. Thus, a color former containing capsule solution A was obtained. To the resulting capsule solution, 5 parts of cellulose powder, 3 parts of wheat starch powder passed through a sieve of 15 to 25 $\mu$, and 80 parts of a 10% oxidized starch solution were added to thereby prepare a capsule solution. The capsule solution was coated on a paper of 40 g/m² using air knife coating in a coating amount (solid content) of 5.5 g/m² and thus A Sheet was obtained.

Preparation of B and C Sheets

In 280 parts of water containing 6 parts of a 40% by weight sodium hydroxide aqueous solution was dispersed 100 parts of a sulfuric acid treated acid clay using a homogenizer. Then, 50 parts of a 10% aqueous solution of sodium caseinate and 30 parts of a styrene-butadiene rubber latex were added. The resulting liquid was coated on a paper of 40 g/m² using air knife coating so as to provide a solid content of 8 g/m² and dried. The paper was subjected to calendering and thus C Sheet was obtained.

On the back of a C Sheet, the above capsule dispersion liquid was coated using air knife coating in an amount of 6 g/m² (solid content) and dried, and thus B Sheet was obtained.

Test Procedure 50 sets of A, B, and C Sheets in the order of A—B—B—C were stacked and cut to a size of 3 × 5 cm. To the cut edge of the stack, an adhesive was coated in an amount of 5 g/100 cm² and dried at room temperature (about 20° ~ 30°C). One hour after the drying, the adhesiveness and the separability were measured using the following methods.

Measurement of Adhesiveness

The adhesion strength (in g) was measured using a tensile strength tester (trade name: Strograph M type, produced by Toyo Seiki Seisakujo). The measuring conditions were as follows:

| | |
|---|---|
| Load Capacity | 1 kg |
| Tension Speed | 150 mm/minute |
| Load Detector | U gauge type load convertor |
| Recorder | Feed speed 200 mm/minute |

Measurement of Separability

| | |
|---|---|
| No adhesion between C and A Sheets | 100 |
| Slightly adhered, but easily peeled apart | 80 |
| Adhered and peeled apart with difficulty | 60 |
| Completely adhered and not peeled apart at all (separation is impossible) | 0 |

EXAMPLE 1

A sodium salt of a naphthalene sulfonic acid-formaldehyde condensation product ($n = 5 ~ 6$; $R = H$) was dissolved in hot water at 50°C in the concentrations as indicated in Table 1. To the resulting solutions, sodium sulfate as a water-soluble metal salt was added in the concentrations as indicated in Table 1 to prepare four kinds of adhesive compositions as indicated in Table 1. The adhesiveness between A—B, B—B, and B—C, and the separability were measured. The results obtained are indicated in Table 1.

TABLE 1

| | Adhesive Composition | | | |
|---|---|---|---|---|
| | 1 | 2 | 3 | 4 |
| Concentration of | 8 | 8 | 20 | 20 |

TABLE 1-continued

| | Adhesive Composition | | | |
|---|---|---|---|---|
| | 1 | 2 | 3 | 4 |
| Condensation Product (%) | | | | |
| Concentration of Sodium Sulfate (%) | 0.5 | 2 | 0.5 | 2 |
| Adhesiveness (g) | | | | |
| A-A | 52 | 60 | 80 | 82 |
| B-B | 93 | 95 | 100 | 95 |
| B-C | 110 | 120 | 110 | 120 |

With adhesive compositions containing the sodium salt of naphthalene sulfonic acid-formaldehyde condensation product alone and not containing the water-soluble metal salt, measurement of adhesiveness and separability were made and the results obtained are shown in Table 2.

TABLE 2

| | Adhesive Composition | |
|---|---|---|
| | 5 | 6 |
| Concentration of Condensation Product (%) | 8 | 20 |
| Adhesiveness (g) | | |
| A-B | 2 | 21 |
| B-B | 3 | 22 |
| B-C | 2 | 19 |
| Separability | 100 | 100 |

As apparent from the above results, the adhesive compositions of the present invention (1 ~ 4) containing the sodium salt of the naphthalene sulfonic acid-formaldehyde condensation product and the water-soluble metal salt as indicated in Table 1 have a quite high adhesiveness as compared with those comparative adhesive compositions (5 ~ 6) as indicated in Table 2.

EXAMPLE 2

In 85 g of water at 50°C, 15 g of a sodium salt of a naphthalene sulfonic acid-formaldehyde condensation product was dissolved.

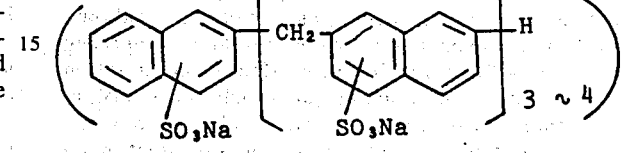

To the resulting solution, 15 g of a modified styrene-butadiene copolymer latex (solid content: 49% by weight; pH: 6.8; viscosity: 95 c.p. at 25°C; particle size: 0.1 to 0.15 $\mu$) and 1 g of sodium sulfate as a water-soluble metal salt were added and dissolved. The resulting adhesive composition was tested, and the following quite high adhesiveness was obtained. The separability was 100.

| Adhesiveness between A-B | 430 g |
|---|---|
| Adhesiveness between B-B | 550 g |
| Adhesiveness between B-C | 450 g |

EXAMPLE 3

On using zinc chloride in place of the sodium sulfate in Example 1, the following results were obtained.

TABLE 3

| | Adhesive Composition | | | |
|---|---|---|---|---|
| | 7 | 8 | 9 | 10 |
| Concentration of Condensation Product (%) | 8 | 8 | 20 | 20 |
| Concentration of Zinc Chloride (%) | 0.5 | 2 | 0.5 | 2 |
| Adhesiveness (g) | | | | |
| A-B | 40 | 55 | 70 | 75 |
| B-B | 80 | 90 | 95 | 95 |
| B-C | 105 | 110 | 110 | 120 |
| Separability | 100 | 100 | 100 | 100 |

These values are quite high as compared with those as obtained with the adhesive compositions containing the condensation product alone (5 ~ 6) in Table 2 of Example 1.

EXAMPLE 4

On using aluminum sulfate in place of the sodium sulfate in Example 1, the following results were obtained.

TABLE 4

| | Adhesive Composition | | | |
|---|---|---|---|---|
| | 11 | 12 | 13 | 14 |
| Concentration of Condensation Product (%) | 8 | 8 | 20 | 20 |
| Concentration of Zinc Chloride (%) | 0.5 | 2 | 0.5 | 2 |
| Adhesiveness (g) | | | | |
| A-B | 55 | 65 | 72 | 80 |
| B-B | 80 | 103 | 93 | 90 |
| B-C | 95 | 105 | 105 | 110 |
| Separability | 100 | 100 | 100 | 100 |

While the invention has been described in detail and with reference to specific embodiments thereof, it will be apparent to one skilled in the art that various changes and modifications can be made therein without departing from the spirit and scope thereof.

What is claimed is:

1. A process for separating a number of pressure sensitive copying papers into groups which comprises (1) coating an adhesive composition comprising a naphthalene sulfonic acid-formaldehyde condensation product and a water-soluble metal salt on an edge of a stack assembly of said copying papers and then (2) fanning said copying papers; said naphthalene sulfonic acid-formaldehyde condensation product comprising about 5 to 40% by weight of the adhesive composition and said watersoluble metal salt, which consists of an ammonium salt or a salt of a metal selected from the group consisting of a univalent metal, a divalent metal and a trivalent metal, comprising about 0.1 to 6% by weight of the adhesive composition.

2. The process according to claim 1, wherein the naphthalene sulfonic acid-formaldehyde condensation product is represented by the formula:

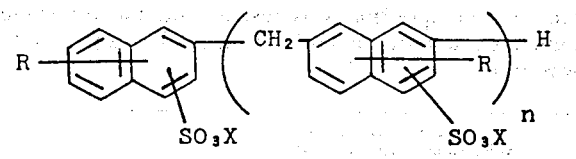

wherein R, which may be the same or different and a plurality of which may be present on the naphthalene nuclei, is a hydrogen atom or an alkyl group; X is a hydrogen atom, an alkali metal atom, or an ammonium group; and n is an integer.

3. The process according to claim 2, wherein R is an alkyl group containing 1 to 4 carbon atoms.

4. The process according to claim 2, wherein X is a sodium atom.

5. The process according to claim 2, wherein X is a potassium atom.

6. The process according to claim 2, wherein n is an integer of from 1 to 5.

7. The process according to claim 1, wherein the water-soluble metal salt is a salt of a univalent metal, a divalent metal, or a trivalent metal.

8. The process according to Claim 7, wherein the water-soluble metal salt is selected from the group consisting of $K_2SO_4$, $Na_2SO_4$, $ZnCl_2$, and $ZnSO_4$.

9. The process according to claim 1, wherein said adhesive composition includes a surface active agent in a proportion of 0.1 to 5% by weight based upon the weight of the naphthalene sulfonic acid-formaldehyde condensation product.

* * * * *